US011062495B2

(12) United States Patent
Bisceglio et al.

(10) Patent No.: US 11,062,495 B2
(45) Date of Patent: Jul. 13, 2021

(54) SYSTEMS AND METHODS FOR PARTITIONING AN ANIMATABLE MODEL

(71) Applicant: Disney Enterprises, Inc., Burbank, CA (US)

(72) Inventors: Justin Bisceglio, New York, NY (US); Christopher Franz Moore, Ramsey, NJ (US); Daniel Sampaio Lima, White Plains, NY (US); Scotty Sharp, Millwood, NY (US); Steven Song, Armonk, NY (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 16/537,482

(22) Filed: Aug. 9, 2019

(65) Prior Publication Data

US 2021/0042981 A1 Feb. 11, 2021

(51) Int. Cl.
*G06T 13/40* (2011.01)
(52) U.S. Cl.
CPC .......... *G06T 13/40* (2013.01); *G06T 2200/24* (2013.01)
(58) Field of Classification Search
CPC ............................ G06T 13/40; G06T 2200/24
See application file for complete search history.

(56) References Cited

U.S. PATENT DOCUMENTS

2010/0321386 A1* 12/2010 Lin .................... G06T 19/20
345/420
2019/0340803 A1* 11/2019 Comer ................... G06T 13/40

* cited by examiner

*Primary Examiner* — Maurice L. McDowell, Jr.
*Assistant Examiner* — Donna J. Ricks
(74) *Attorney, Agent, or Firm* — Sheppard Mullin Richter & Hampton LLP

(57) ABSTRACT

Systems and methods are disclosed for partitioning an animatable model. The system may include a non-transitory computer-readable medium operatively coupled to processors. The non-transitory computer-readable medium may store instructions that, when executed, cause the processors to perform a number of operations. One operation may include obtaining an animatable model. The animatable model may include a geometry matrix. Another operation may include obtaining user input to partition an animatable model into multiple partitions. The user input may include a connected curve in the geometry matrix. Yet another operation may include partitioning the animatable model into the multiple partitions based on the user input. Individual ones of the multiple partitions may include a partition geometry matrix and a corresponding partition animatable model.

19 Claims, 12 Drawing Sheets

SYSTEMS AND METHODS FOR PARTITIONING AN ANIMATABLE MODEL

TECHNICAL FIELD

The present disclosure relates generally to animatable models.

SUMMARY

Embodiments of the disclosure are directed to systems and methods for partitioning an animatable model. In one embodiment, a system for partitioning an animatable model may include a non-transitory computer-readable medium operatively coupled to processors. The non-transitory computer-readable medium may store instructions that, when executed, cause the processors to perform a number of operations. One operation may include obtaining an animatable model. The animatable model may include a geometry matrix. Another operation may include obtaining user input to partition an animatable model into multiple partitions. The user input may include a connected curve in the geometry matrix. Yet another operation may include partitioning the animatable model into the multiple partitions based on the user input. Individual ones of the multiple partitions may include a partition geometry matrix and a corresponding partition animatable model.

In embodiments, another operation may include obtaining animation data. Yet another operation may include driving the multiple partitions in parallel to animate the animatable model for multiple frames based on the animation data.

In embodiments, the animation data may include information on how the animatable model will be animated over the multiple frames.

In embodiments, the animatable model may represent a humanoid character.

In embodiments, the multiple partitions may represent different body parts of the humanoid character.

In embodiments, the multiple partitions may represent different sub-body parts.

In another embodiment, a computer-implemented method for partitioning an animatable model is disclosed. The computer-implemented method may be implemented in a computer system. The computer system may include a non-transient electronic storage and a physical computer processor. The computer-implemented method may include obtaining an animatable model. The animatable model may include a geometry matrix. The computer-implemented method may also include obtaining user input to partition an animatable model into multiple partitions. The computer-implemented method may further include partitioning the animatable model into the multiple partitions based on the user input. Individual ones of the multiple partitions may include a partition geometry matrix and a corresponding partition animatable model.

In embodiments, the computer-implemented method may further include obtaining animation data. The computer-implemented method may also include driving the multiple partitions in parallel to animate the animatable model for multiple frames based on animation data.

In embodiments, the animation data may include information on how the animatable model will be animated over the multiple frames.

In embodiments, the animatable model may represent an animal character.

In embodiments, the multiple partitions may represent different body parts of the animal character.

In embodiments, the multiple partitions may further represent different sub-body parts.

In embodiments, the user input may include a connected shape in the geometry matrix.

In another embodiment, a computer-implemented method for partitioning an animatable model is disclosed. The computer-implemented method may be implemented in a computer system. The computer system may include non-transient electronic storage and a physical computer processor. The computer-implemented method may include obtaining an animatable model. The animatable model may include a geometry matrix. The computer-implemented method may further include partitioning the animatable model into multiple individually drivable partitions. The individual ones of the multiple partitions may include a partition geometry matrix and a corresponding partition animatable model.

In embodiments, the computer-implemented method may further include driving the multiple partitions in parallel to animate the animatable model as a unitary model.

In embodiments, partitioning the animatable model into the multiple partitions may be based on animation data.

In embodiments, the animation data may include motion density information.

In embodiments, partitioning the animatable model into the multiple partitions may be based on weight maps.

In embodiments, partitioning the animatable model into the multiple partitions may be based on node density.

In embodiments, the computer system may further include a graphical user interface. The computer-implemented method may further include displaying multiple frames in which the animatable model is animated by driving the multiple partitions in parallel.

Other features and aspects of the disclosed technology will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

Further aspects of the present disclosure will be more readily appreciated upon review of the detailed description of the various disclosed embodiments, described below, when taken in conjunction with the accompanying figures.

The figures are described in greater detail in the description and examples below, are provided for purposes of illustration only, and merely depict typical or example embodiments of the disclosure. The figures are not intended to be exhaustive or to limit the disclosure to the precise form disclosed. It should also be understood that the disclosure may be practiced with modification or alteration, and that the disclosure may be limited only by the claims and the equivalents thereof.

DETAILED DESCRIPTION

Animatable models bring geometry matrices to life based in part on rigs. The rigs may be virtual skeletons that manipulate the animatable models. In order to test the effectiveness of rigs, it may be appropriate to animate the animatable models to perform a number of actions. For example, in order to test whether a frown looks realistic, or at least looks how a director may want the frown to look, the face of the animatable model may be animated to express a frown. Existing technology may animate the animatable model at around 10 frames per second (FPS). In other words, a number of existing technologies may not be able to leverage the multi-core reality of today's computers. Other existing technology may use proprietary software that is specific to the a proprietary workflow. Some existing technologies may require defining individual nodes of the animatable model. Other existing technologies may leverage caching, which can defeat the purpose of efficiency and time savings when the animatable model is updated. Most of these existing technologies also require user training.

Embodiments of the present disclosure are directed to systems and methods for partitioning an animatable model. In various deployments described herein, a user may partition the animatable model into one or more partitions. The one or more partitions may be defined by connected curves, connected lines, or other continuous shapes along a geometry matrix of the animatable model. The one or more partitions may be used in various, different workflows to animate, drive, or otherwise process the animatable model.

Figure 1:
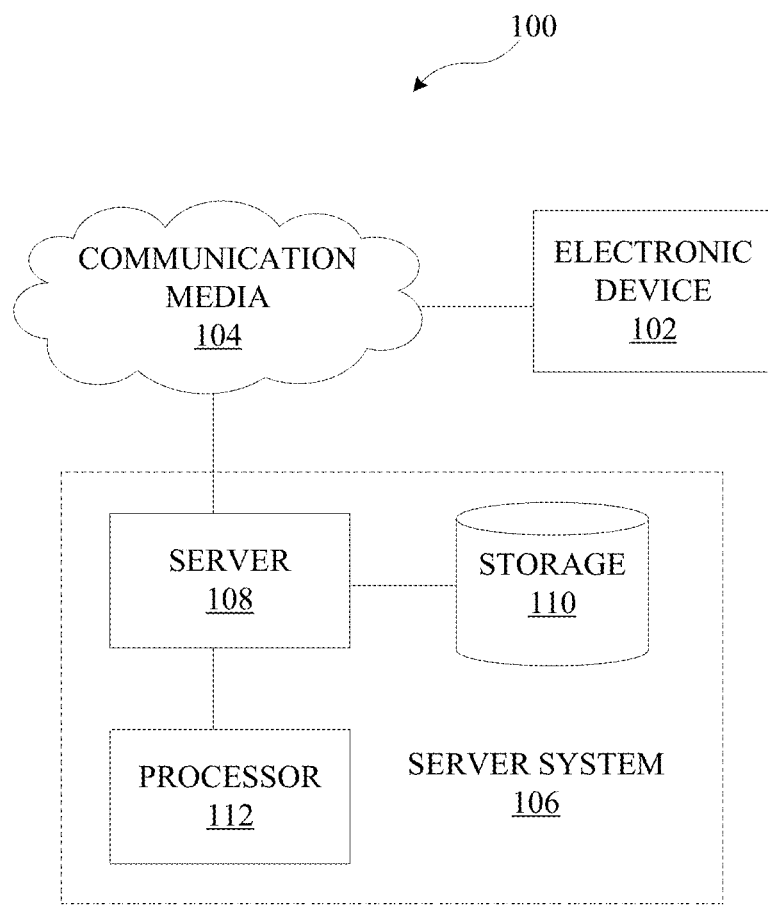
FIG. 1 illustrates an example environment in which embodiments of the disclosure may be implemented.

FIG. 1 depicts example environment 100, which may be used in connection with implementing embodiments of the disclosed systems, methods, and devices. By way of example, the various below-described partitions of FIG. 1 may be used for partitioning an animatable model. The animatable model may represent a character in a movie, tv show, video game, and/or other media. The animatable model may be a humanoid, an animal, a fictional creature, an object, and/or other characters. The animatable model may be one-dimensional, two-dimensional, or three-dimensional.

The animatable model may include one or more features (e.g., rig, deformer, geometry matrix, size, material, texture, surface, metadata, and/or other features) and/or other information (e.g., animation data, weight map, vertex density, vertex animation density, node density, etc.). The animatable model may be generated by applying a rig to (e.g., rigging) an inanimate model, or otherwise coupling the rig to the inanimate model. The inanimate model may sometimes be referred to as a geometry matrix and/or mesh.

The geometry matrix may include the shapes of the one or more animatable models (e.g., simple shapes, such as squares, rectangles, triangles, etc.; complex shapes, such as heads, bodies, cars, etc.; and/or other shapes). The geometry matrix may be displayed on a graphical user interface for a user to interact with and/or otherwise observe. The shapes may include multiple, connected vertices. The multiple, connected vertices may define multiple sub-shapes that form the geometry matrix of the animatable model. In other words, the sub-shapes may represent the smallest unit defining the geometry matrix. For example, the sub-shapes may be rectangles, square, triangles, and/or other shapes. In some embodiments, the sub-shapes may be deformed to fit onto a three-dimensional model. The size of the one or more animatable models may correspond to the coordinates defining the animatable model in a coordinate system.

A rig may represent the virtual skeleton to be coupled to the geometry matrix to generate an animatable model. The virtual skeleton may include one or more bones, joints, and/or other skeletal portions. The one or more bones may be couplable to each other via the joints. Individual ones of the one or more bones may depend on other ones of the one or more bones. For example, movement of an upper arm bone in the rig may also move and/or rotate an elbow joint, a forearm bone, a wrist joint, and a hand bone. In one example, rotation of the elbow joint in the rig may rotate and/or move the upper arm bone, the forearm bone, the wrist joint, and the hand bone. In some embodiments, the rig may include a muscle system that may be couplable to the virtual skeleton. The chain of dependencies may be referred to as a hierarchy. In some embodiments, one or more bones and/or joints may be independent from other bones and/or joints, such that, for example, moving a first bone does not affect the independent bone. The rig may include one or more deformers.

The one or more deformers may manipulate and/or drive the rig. The one or more deformers may be applied and/or otherwise coupled to the rig itself and/or individual skeletal portions of the rig. For example, a rotate deformer may allow an arm bone of a humanoid animatable model to rotate to a selected degree (e.g., the animatable model may substantially simulate a typical human arm, which cannot typically rotate 360 degrees). In one example, a translate deformer may allow the arm bone to move around (e.g., the arm bone can go up, down, left, and right in space). In some embodiments, the arm bone may be coupled to a body bone such that the arm bone could not be moved ten feet above the body bone of a humanoid animatable model. In other words, since the arm bone is coupled to the body, its movement may be restricted by the physics of the body bone. A scale deformer may affect a shape of the animatable model (e.g., flatten the animatable model, expand the animatable model, and/or otherwise scale the animatable model). It should be appreciated that many other deformers exist that can be used to manipulate and/or drive one or more skeletal portions of the animatable model. For example, deformers may include repulsors, attractors, volume deformers, and/or other deformers. Deformers may sometimes be referred to as modifiers. The set of interconnected deformers may drive and/or manipulate the virtual skeleton of the animatable model. The muscle system may be coupled to the virtual skeleton to manipulate the volume of the geometry matrix as a portion of the geometry matrix is rotated, translated, and/or otherwise manipulated. For example, the muscle system may enlarge an upper arm of an animatable model when the animatable model flexes an upper arm. In further detail, a portion of the upper arm closest to the elbow joint may be flattened to simulate how the human arm deforms when a bicep is flexed.

The deformers and dependencies may be referred to as nodes. Nodes may include one or more of a title, metadata, a deformer, a dependency, and/or other information. For example, the title of a node may be "rotate right elbow." Metadata may identify the right elbow joint the node is attributed to or otherwise affecting. The deformer may be a rotate deformer. In one example, the dependency may identify a dependency on the upper arm bone. The dependency may identify a forearm bone's dependency on the elbow joint. Coupling the deformers to the rig may generate an animatable rig.

The material may include what the surface of a animatable model is and/or appears to be when rendered. For example, an eyeball, may have different material than fur, skin, or metal. The texture may include more specific information on the material. For example, dry skin may look different than soft skin or shiny metal may look different than dull metal. The surface may include anything else that will be appreciated to relate to the surface appearance of the one or more animatable models. The color may include the colors to appear on the animatable model, the granularity of colors, how the one or more animatable models are colored, etc.

The user input may include selecting one or more connected curves, lines, and/or shapes on the geometry matrix. For example, the animatable model may be displayed on a graphical user interface. In some embodiments, the connected curves, lines, and/or shapes may be defined by two or more vertices on the geometry matrix. The two or more vertices may be connected along the shortest curve and/or line between each of the two or more vertices to form a closed curve and/or line. An inner portion of the connected curve may define a first partition. An outer portion of the connected curve may define a second partition. It should be appreciated the user input may include multiple sets of two or more vertices and corresponding connected curves and/or lines to form multiple partitions. In some embodiments, the user input may include drawing a connected curve, line, and/or shape to define a partition. In one example, the user input may include a curve drawn around each leg of a dog-like animatable model, a curve drawn around the head of the dog-like animatable model, a curve drawn around each ear of the dog-like animatable model, a curve drawn around each eye of the dog-like animatable model, and a curve drawn around the mouth of the dog-like animatable model. The user input may be used to form eleven partitions. In some embodiments, the user may select this on the animatable model to dynamically partition the animatable model (e.g., draw a curve on the animatable model in a graphical user interface which also partitions the animatable model ("on the fly")). In embodiments, the user may store the user input as a separate file. The file may be obtained and applied to the animatable model to partition the animatable model. In some embodiments, partitions may be grouped to form one partition. For example, while the legs of the dog-like animatable model are not physically connected to each other, the four leg partitions described above may be re-grouped as one lower body partition.

The user input may be used to partition the animatable model. Continuing the example above, the dog-like animatable model may include eleven different partitions of the animatable model. The eleven different partitions may include four leg partitions; a body partition, indirectly partitioned from the leg partitions and the head partition; two ear partitions; two eye partitions; a mouth partition; and the remaining portion of the head partition. The individual partition may include a partition geometry matrix and a partition animatable model, which correspond to a partition level of the geometry matrix and animatable model described herein.

The individual partitions may be individually processable to increase the use of available processing resources. In other words, the individual partitions may be able to better leverage multiple cores of computer systems. In some embodiments, the individual partitions may be processed in parallel. In embodiments, individual partitions may be processed by individual cores of a multi-core system. For example, a first leg partition may be processed by a first core, a second leg partition may be processed by a second core, and so on. In some embodiments, individual partitions may be processed using multithreading. Multithreading may refer to a processor providing multiple threads of execution concurrently. Multithreading may be used with multi-core processing. Among other things, partitioning the animatable model may improve frame rate of the animation.

The multiple partitions may respect the hierarchy and interconnected virtual skeleton of the rig. In other words, individual partitions that include the same bone, joint, deformer, and/or dependency may each include the entire bone, joint, deformer, and/or dependency information. For example, a first partition may include a first half of a forearm bone that may be coupled to an elbow joint, and the second partition may include a second half of a forearm bone that may be coupled to a wrist joint. Both partitions may include the entire forearm bone and corresponding deformers and dependencies.

In some embodiments, the multiple partitions may end at the end of a bone and/or joint. The bone, joint, and/or corresponding deformers may not be added to both partitions (e.g., the first partition may include the bone and/or joint as well as the second partition touching the first partition). It should be appreciated that the dependencies may be propagated through to the nearby partitions (e.g., the first partition is an upper arm bone, and the second partition is a forearm bone; the forearm bone depends on deformations and/or movements from the upper arm bone, and so the second partition includes the dependency from the first partition). Continuing one of the examples above of the dog-like animatable model, the leg partitions move as the body partition moves, even though the animatable model is partitioned because the dependencies of the leg on the body are copied onto the leg partition. It should be appreciated that dependencies are not limited to adjacent or neighboring partitions.

The animatable model may include animation data. The animation data may include information on how the animatable model will be animated over multiple frames. The animation data may include information as a function of position on the animatable model. The animation data may specify what body parts (e.g., head, torso, arms, legs), sub-body parts (e.g., eyes, nose, mouth, teeth, ears, eyebrows, etc. for the head), vertices of the geometry matrix, and/or other regions of interest are being manipulated over the multiple frames. The animation data may include motion density information indicating where movement and/or manipulation occurs during the multiple frames. High motion density regions of interest may be identified and sub-partitioned while multiple low motion density regions of interest may be identified and partitioned together. For example, the motion density information may identify and partition the mouth and teeth as high motion density regions of interest during the multiple frames because it is a close up shot of the face of the animatable model, and the animatable model speaks often during the multiple frames. In some embodiments, the mouth and teeth may be sub-partitioned into smaller partitions. In the same multiple frames, the low motion density regions of interest may be the torso, legs, and arms. For these multiple frames, the animatable model may be separated into multiple partitions on the face, while the rest of the animatable model may be one partition.

The animatable model may include weight maps that affect the amount of deformation a bone and/or joint has on the nearby geometry matrix. For example, weight maps may increase an effect a rotation of the elbow joint has on the nearby portions of the geometry matrix than a movement of the forearm bone because the rotation of the elbow joint may twist the geometry matrix and otherwise affect the geometry matrix more than a simple translation of the forearm bone.

The animatable model may describe a vertex density. A vertex density may include a density of animatable vertices in a region of interest. For example, a face may include more vertices than a foot of an animatable model. In some embodiments, the vertex density may be used to partition the animatable model. In embodiments, the partitions may be based on a threshold number of vertices (e.g., one partition per 10 vertices, 100 vertices, 1000 vertices, 10,000 vertices, etc.).

In some embodiments, the vertex density may be combined with the animation data to generate a vertex animation density. The vertex animation density may include the number of vertices that are animated in a region of interest. In embodiments, the vertex animation density may include the amount of displacement of the vertices in the region of interest from a neutral position. In some embodiments, the vertex animation includes both of the above. For example, in a first multiple frames the animatable model may have a close up on the face while speaking. Based on the number of vertices animated in a region of interest, the face may be partitioned into multiple partitions (e.g., the mouth, the nose, the ears, the eyes, and the remaining portion of the head) while the rest of the animatable model comprises one partition. Based on the displacement of the vertices, the mouth may be partitioned into multiple partitions, the rest of the face may be a single partition, and the rest of the animatable model may be another single partition.

In some embodiments, the animatable model may include a node density. The node density may include the number of nodes attributed, or otherwise coupled, to and/or affecting a bone and/or joint. In embodiments, the multiple nodes of a single bone and/or joint may be partitioned based on a node density threshold. The node density threshold may be about five nodes per partition, about ten nodes per partition, about twenty nodes per partition, about fifty nodes per partition, and so on. It should be appreciated that the node density may be combined with other information described above to partition the animatable model.

In embodiments, the animatable model may be dynamically animated (e.g., on the fly). In some embodiments, the animatable model may be animated based on the animation data. In embodiments, drivers may animate the animatable model by activating the one or more deformers. As described above, the animatable model may appear animated as a unitary model because one or more bones, joints, dependencies, and/or deformers are copied onto each region of interest that includes the one or more bones, joints, dependencies, and/or deformers.

As shown in FIG. 1, environment 100 may include one or more of electronic device 102 and server system 106. Electronic device 102 can be coupled to server system 106 via communication media 104. As will be described in detail herein, electronic device 102 and/or server system 106 may exchange communications signals, including user input, one or more connected curves, one or more connected lines, one or more connected shapes, one or more geometry matrices, one or more deformers, one or more dependencies, one or more nodes, one or more rigs, one or more animatable models, the corresponding features of the one or more animatable models, animation data, weight map, vertex density, vertex animation density, node density, metadata, and/or other information for electronic device 102 via communication media 104.

Electronic device 102 may include a variety of electronic computing devices, such as, for example, a smartphone, tablet, laptop, wearable device, and similar devices. Here, a graphical user interface of electronic device 102 may perform such functions as accepting and/or receiving user input and displaying content (e.g., animatable model, geometry matrix, rig, nodes, etc.). The graphical user interface may be provided by various operating systems known in the art, such as, for example, iOS, Android, Windows Mobile, Windows, Mac OS, Chrome OS, Linux, Unix, Maya, Blender, a gaming platform OS (e.g., Xbox, PlayStation, Wii), and/or other operating systems.

In various embodiments, communication media 104 may be based on one or more wireless communication protocols such as Bluetooth®, ZigBee, 802.11 protocols, Infrared (IR), Radio Frequency (RF), 2G, 3G, 4G, 5G, and/or wired protocols and media. Communication media 104 may be implemented as a single medium in some cases.

As mentioned, electronic device 102 may take a variety of forms, such as a desktop or laptop computer, a smartphone, a tablet, a smartwatch or other wearable electronic device, or the like. Electronic device 102 may communicate with other devices and/or with one another over communication media 104 with or without the use of server system 106. In various embodiments, electronic device 102 and/or server system 106 may be used to perform various processes described herein and/or may be used to execute various operations described herein with regard to one or more disclosed systems and methods. Upon studying the present disclosure, it will be appreciated that environment 100 may include multiple electronic devices 102, communication media 104, server systems 106, servers 108, processors 112, and/or storage 110.

As mentioned, communication media 104 may be used to connect or communicatively couple electronic device 102 and/or server system 106 to one another or to a network, and communication media 104 may be implemented in a variety of forms. For example, communication media 104 may include an Internet connection, such as a local area network (LAN), a wide area network (WAN), a fiber optic network, internet over power lines, a hard-wired connection (e.g., a bus), and the like, or any other kind of network connection. Communication media 104 may be implemented using any combination of routers, cables, modems, switches, fiber optics, wires, radio (e.g., microwave/RF links), and the like. Further, communication media 104 may be implemented using various wireless standards, such as Bluetooth, Wi-Fi, 3GPP standards (e.g., 2G GSM/GPRS/EDGE, 3G UMTS/CDMA2000, 4G LTE/LTE-U/LTE-A, 5G). Upon reading the present disclosure, it will be appreciated that there are other ways to implement communication media 104 for communications purposes.

Likewise, though not shown, it will be appreciated that a similar communication medium may be used to connect or communicatively couple server 108, processors 112, and/or storage 110 to one another, in addition to other elements of environment 100. In example embodiments, communication media 104 may be, or include, a wired or wireless wide area network (e.g., cellular, fiber, and/or circuit-switched connection) for electronic device 102 and/or server system 106, which may be relatively geographically disparate; and in some cases, aspects of communication media 104 may involve a wired or wireless local area network (e.g., Wi-Fi, Bluetooth, unlicensed wireless connection, USB, HDMI, and/or standard AV), which may be used to communicatively couple aspects of environment 100 that may be relatively close, geographically. In some embodiments, server system 106 may be remote from electronic device 102.

Server system 106 may provide, receive, collect, or monitor information from electronic device 102, such as, for example, user input, one or more connected curves, one or more connected lines, one or more connected shapes, one or more geometry matrices, one or more deformers, one or more dependencies, one or more nodes, one or more rigs, one or more animatable models, the corresponding features of the one or more animatable models, animation data, weight map, vertex density, vertex animation density, node density, metadata, and the like. Server system 106 may be configured to receive or send such information via communication media 104. This information may be stored in storage 110 and may be processed using processors 112. For example, processors 112 may include an analytics engine capable of performing analytics on information that server system 106 has collected, received, or otherwise interacted with, from electronic device 102. In embodiments, server 108, storage 110, and processors 112 may be implemented as a distributed computing network or as a relational database or the like.

Server 108 may include, for example, an Internet server, a router, a desktop or laptop computer, a smartphone, a tablet, a processor, a component, or the like, and may be implemented in various forms, including, for example, an integrated circuit or collection thereof, a printed circuit board or collection thereof, or in a discrete housing/package/rack or multiple of the same.

In embodiments, server 108 directs communications for electronic device 102 over communication media 104. For example, server 108 may process and exchange messages for electronic device 102 that correspond to user input, one or more connected curves, one or more connected lines, one or more connected shapes, one or more geometry matrices, one or more deformers, one or more dependencies, one or more nodes, one or more rigs, one or more animatable models, the corresponding features of the one or more animatable models, animation data, weight map, vertex density, vertex animation density, node density, metadata, and/or other information. Server 108 may update information stored on electronic device 102, for example, by delivering user input, one or more connected curves, one or more connected lines, one or more connected shapes, one or more geometry matrices, one or more deformers, one or more dependencies, one or more nodes, one or more rigs, one or more animatable models, the corresponding features of the one or more animatable models, animation data, weight map, vertex density, vertex animation density, node density, metadata, and/or other information thereto. Server 108 may send/receive information to/from electronic device 102 in real time or sporadically. Further, server 108 may implement cloud computing capabilities for electronic device 102.

Figure 2A:
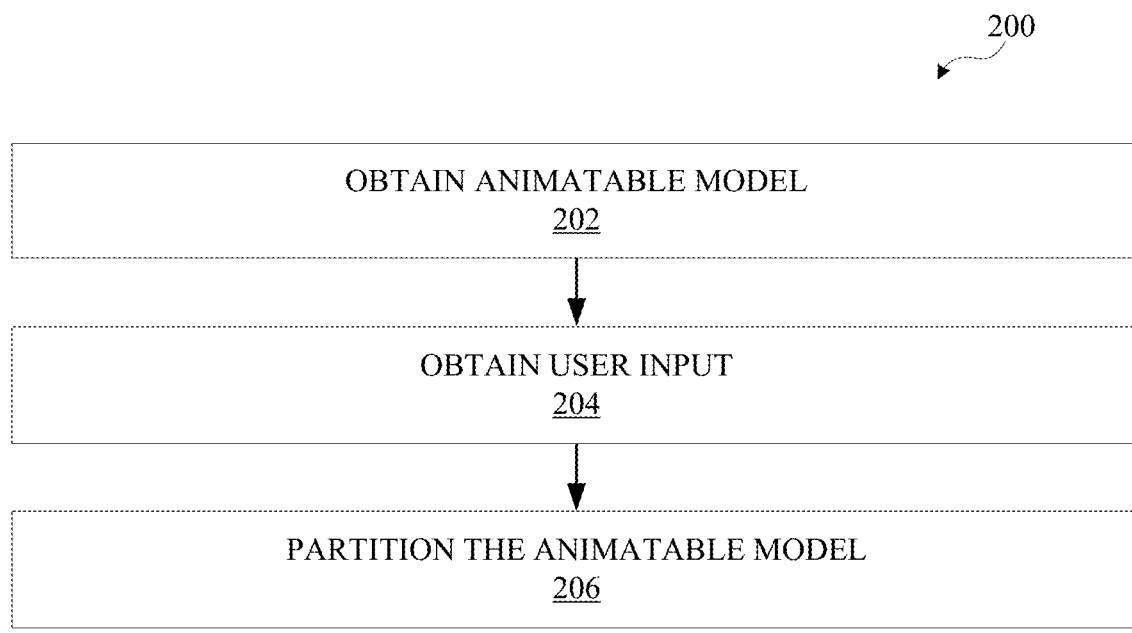
FIG. 2A is an operational flow diagram illustrating various operations that may be performed in accordance with embodiments of the disclosure.

FIG. 2A illustrates a flow diagram depicting various operations of method 200, and accompanying embodiments for partitioning an animatable model, in accordance with aspects of the present disclosure. The operations of the various methods described herein are not necessarily limited to the order described or shown in the figures, and it will be appreciated, upon studying the present disclosure, variations of the order of the operations described herein that are within the spirit and scope of the disclosure.

Figure 11:
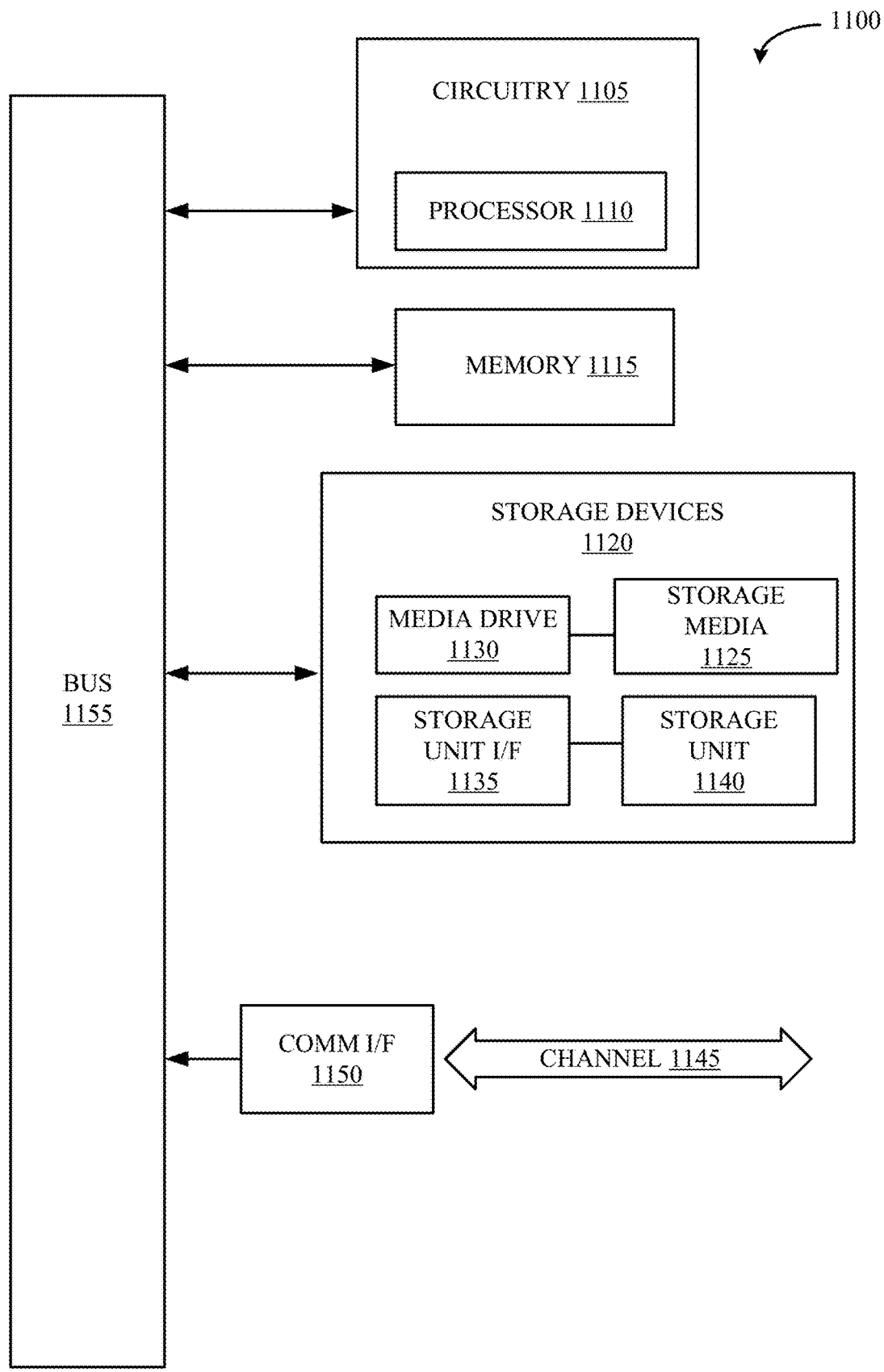
FIG. 11 illustrates an example computing component that may be used to implement features of various embodiments of the disclosure.

The operations and sub-operations of method 200 and 250 may be carried out, in some cases, by one or more of the components, elements, devices, and circuitry of environments 100, device 102, communication media 104, server system 106, server 108, processor 112, and/or computing component 900, described herein and referenced with respect to at least FIGS. 1 and 11, as well as sub-components, elements, devices, and circuitry depicted therein and/or described with respect thereto. In such instances, the description of methods 200 and 250 may refer to a corresponding component, element, etc., but regardless of whether an explicit reference is made, it will be appreciated, upon studying the present disclosure, when the corresponding component, element, etc. may be used. Further, it will be appreciated that such references do not necessarily limit the described methods to the particular component, element, etc. referred to. Thus, it will be appreciated that aspects and features described above in connection with (sub-) components, elements, devices, circuitry, etc., including variations thereof, may be applied to the various operations described in connection with methods 200 and 250 without departing from the scope of the present disclosure.

At operation 202, method 200 includes obtaining an animatable model. The animatable model may be a rigged geometry matrix, as described herein. The animatable model may include a rig, a geometry matrix, one or more nodes, and other features, as described herein.

At operation 204, method 200 includes obtaining user input to partition an animatable model. The user input may include a drawn connected curve, line, and/or shape. The user input may be received over a graphical user interface of an electronic device. In some embodiments, the user input may be stored. The stored user input may be obtained and applied to the animatable model, as described herein.

At operation 206, method 200 includes partitioning the animatable model based on the user input. The partitioned animatable model may be animated based on animation data. Deformers corresponding to individual partitions may drive the corresponding partition independently from other individual partitions. In some embodiments, this independent driving, or processing, may be in parallel using multiple cores and/or multithreading.

In some embodiments, the animatable model may be partitioned based on other information. For example, the animatable model may be partitioned based on one or more of the animation data, weight map, vertex density, vertex animation density, node density, and/or other information as described herein. This information may be used to partition the animatable model to better leverage the processor resources for animating the animatable model.

Figure 2B:
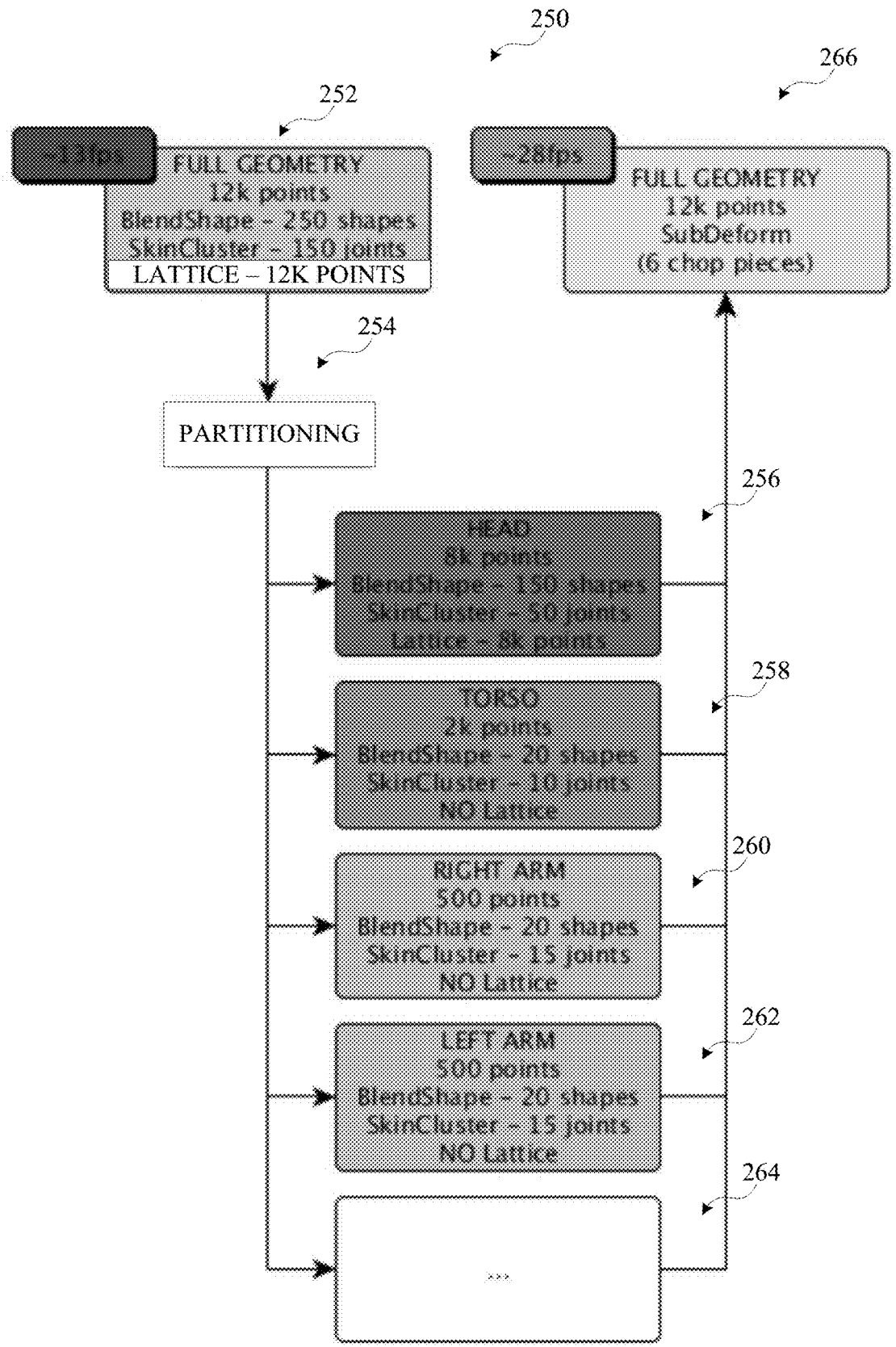
FIG. 2B is an operational flow diagram illustrating various operations that may be performed in accordance with embodiments of the disclosure.

FIG. 2B illustrates a flow diagram depicting various operations of method 250, and accompanying embodiments for partitioning an animatable model, in accordance with aspects of the present disclosure. At operation 252, method 250 includes obtaining an animatable model, which may be substantially similar to operation 202. In one example, the animatable model, which may be referred to as a geometry here, includes about 12,000 points, or vertices. The blend shapes for the animatable model includes about 250 shapes, the skin cluster includes about 150 joints, and the lattice includes about 12,000 points. As should be appreciated, a blend shape may refer to a deformer that allows a point of a geometry matrix to move from a first point to a second point. As should be appreciated, a skin cluster may be refer to a deformer that allows a weight association per joint and/or transform for each point of a geometry matrix. Multiple joints and/or transforms, which may be referred to as a skeleton, may have corresponding weights for all points of a geometry matrix, which may define the base movement of the animatable model deformation. As should be appreciated, a lattice may refer to a deformer that includes a structure of points for carrying out free-form deformation on any deformable geometry matrix.

Operation 254 may be substantially similar to operation 204 and 206. In other swords, the geometry matrix may be copied with no deformers coupled, or otherwise attached to it. The geometry matrix may be partitioned based on user input, as described above. The deformers in the animatable model may be transferred to corresponding individual pieces of the geometry matrix (i.e., the deformers are coupled to the appropriate geometry matrix they were coupled to in the animatable model). For example, in the animatable model a right arm may be driven with 10 joints from a skin cluster and 20 shapes from a blend shape (i.e., deformers). The geometry matrix of the arm partition that is copied over without deformers may be a destination geometry. The 10 joints from a skin cluster and 20 shapes from the blend shape of the right arm may be transferred to the geometry matrix of the arm partition to generate an animatable arm partition. In other words, the same number and type of deformers may be coupled to the destination geometry in the transfer of the deformers. In embodiments, transferring the deformers may include mapping the arm of the animatable model to the geometry matrix of the arm partition that is copied without deformers. Transferring the deformers may also include generating new deformers for the geometry matrix of the arm partition that is copied without deformers that match the type and number of the deformers coupled to the arm of the animatable model.

At operation 256, method 250 includes the partitioned head that includes obtaining user input to partition an animatable model. As illustrated, the head may be partitioned from the animatable model using the process described above.

At operation 258, method 250 includes the partitioned torso that includes obtaining user input to partition an animatable model. As illustrated, the torso may be partitioned from the animatable model using the process described above.

At operation 260, method 250 includes the partitioned right arm that includes obtaining user input to partition an animatable model. As illustrated, the right arm may be partitioned from the animatable model using the process described above.

At operation 262, method 250 includes the partitioned left arm that includes obtaining user input to partition an animatable model. As illustrated, the left arm may be partitioned from the animatable model using the process described above.

At operation 264, method 250 includes additional partitions. As indicated in operation 266, there may be 6 partitions. The ellipsis in operation 264 may indicate that it should be appreciated that a greater number of partitions is possible for different applications.

At operation 266, method 250 includes the partitioned animatable model. As illustrated, the partitioned animatable model includes 6 partitions that are individually driven by their corresponding deformers. An effect of partitioning the animatable model into independent partitions, individual ones of the partitions may drive the animation themselves. In other words, using multiple source geometries that can be deformed by other deformers, the deformation of a corresponding geometry can be determined. For example, a single vertex of the corresponding geometry may coincide, in the model space, with another single vertex from any of the source geometries. This may cause the corresponding geometry vertex to be completely driven by the respective vertex from any of the source geometries. In another example, a single vertex of the corresponding geometry may coincide, in the model space, with two vertices from two different geometry sources. This may cause the single vertex of the corresponding geometry to be driven partially by a first geometry source and partially by a second geometry source (e.g., each geometry source may drive the corresponding geometry by fifty percent). It should be appreciated that each geometry source may be weighted differently such that an effect each geometry source has on the corresponding geometry may be different based on the weights. For example, an alternative to the example above, the first geometry source may drive the corresponding geometry vertex by ten percent and the second geometry source may drive the corresponding geometry vertex by ninety percent. The partitioned animatable model may be driven independently by the partitions and their corresponding deformers to animate the animatable model.

Figure 3:
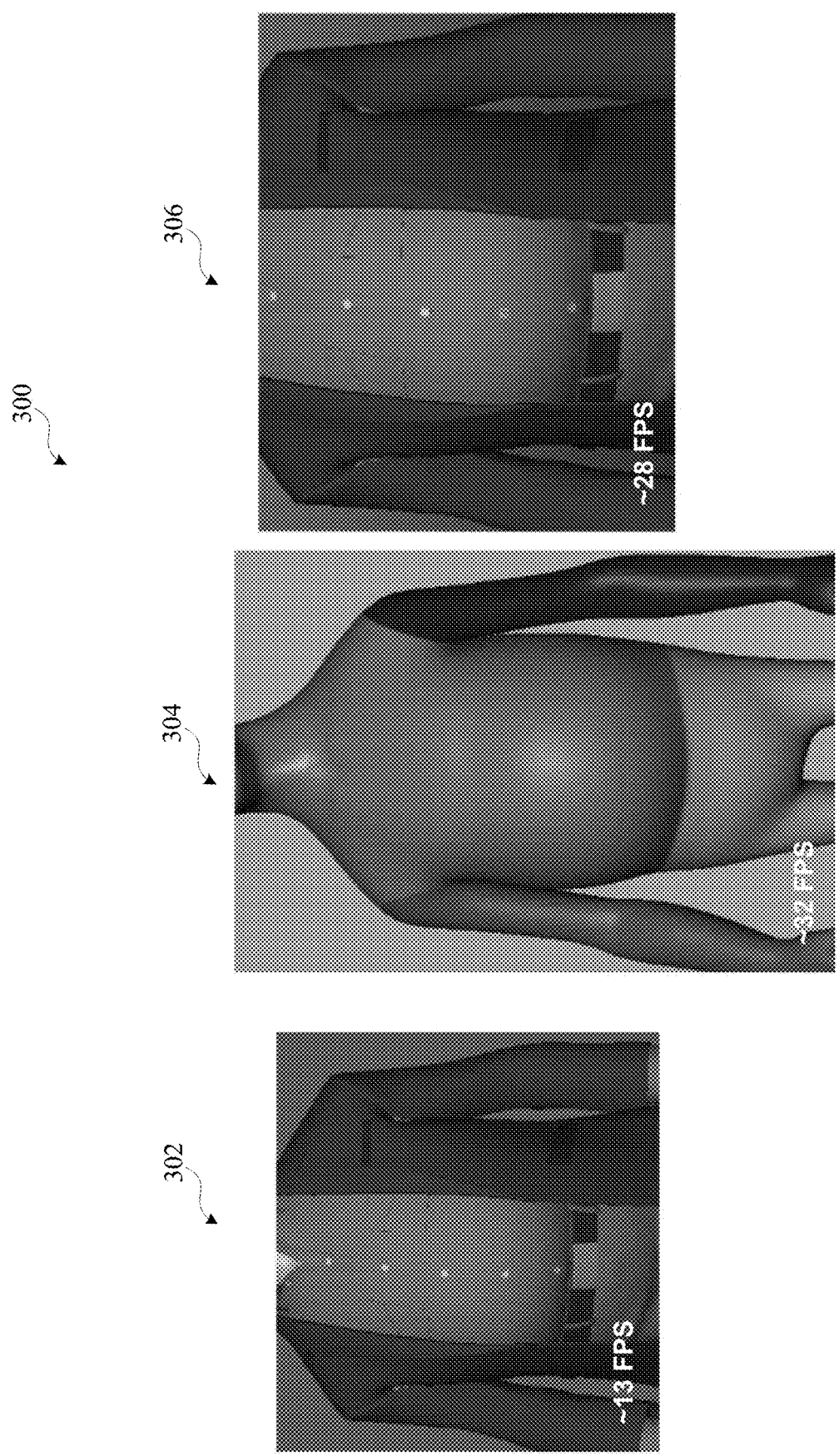
FIG. 3 illustrates example partitions of example animatable models, in accordance with embodiments of the disclosure.

FIG. 3 illustrates example partitions of example animatable models, in accordance with embodiments of the disclosure. As illustrated, 302 may illustrate an animatable model driven using existing technology providing about thirteen frames per second (FPS). 304 illustrates five partitions driven in parallel providing about thirty-two FPS. 306 illustrates the whole animatable model driven with independent deformers providing about 28 FPS.

Figure 4:
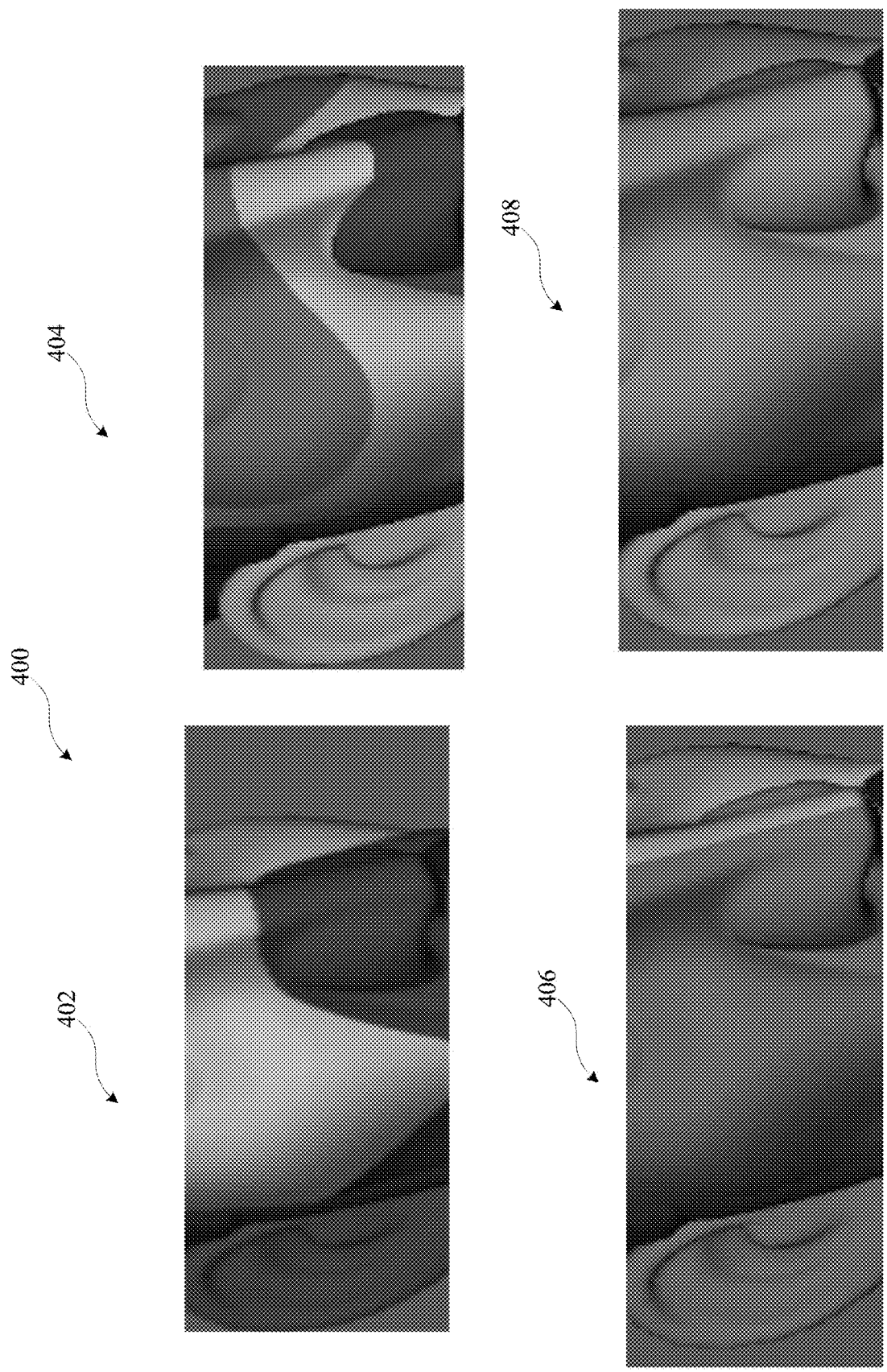
FIG. 4 illustrates example partitions of example animatable models, in accordance with embodiments of the disclosure.

FIG. 4 illustrates example partitions of example animatable models, in accordance with embodiments of the disclosure. 402 illustrates the face partitioned into two partitions (e.g., the ears, nose, and downward representing a first partition, and the area above it representing the second partition). 404 illustrates the face partitioned into five partitions (e.g., the eyes partition, the nose and mouth partition, the ears partition, the neck down partition, and the rest of the head partition), 406 illustrates the face partitions into two partitions again (e.g., the face split down the middle). 408 illustrates the animatable model without partitioning.

Figure 5:
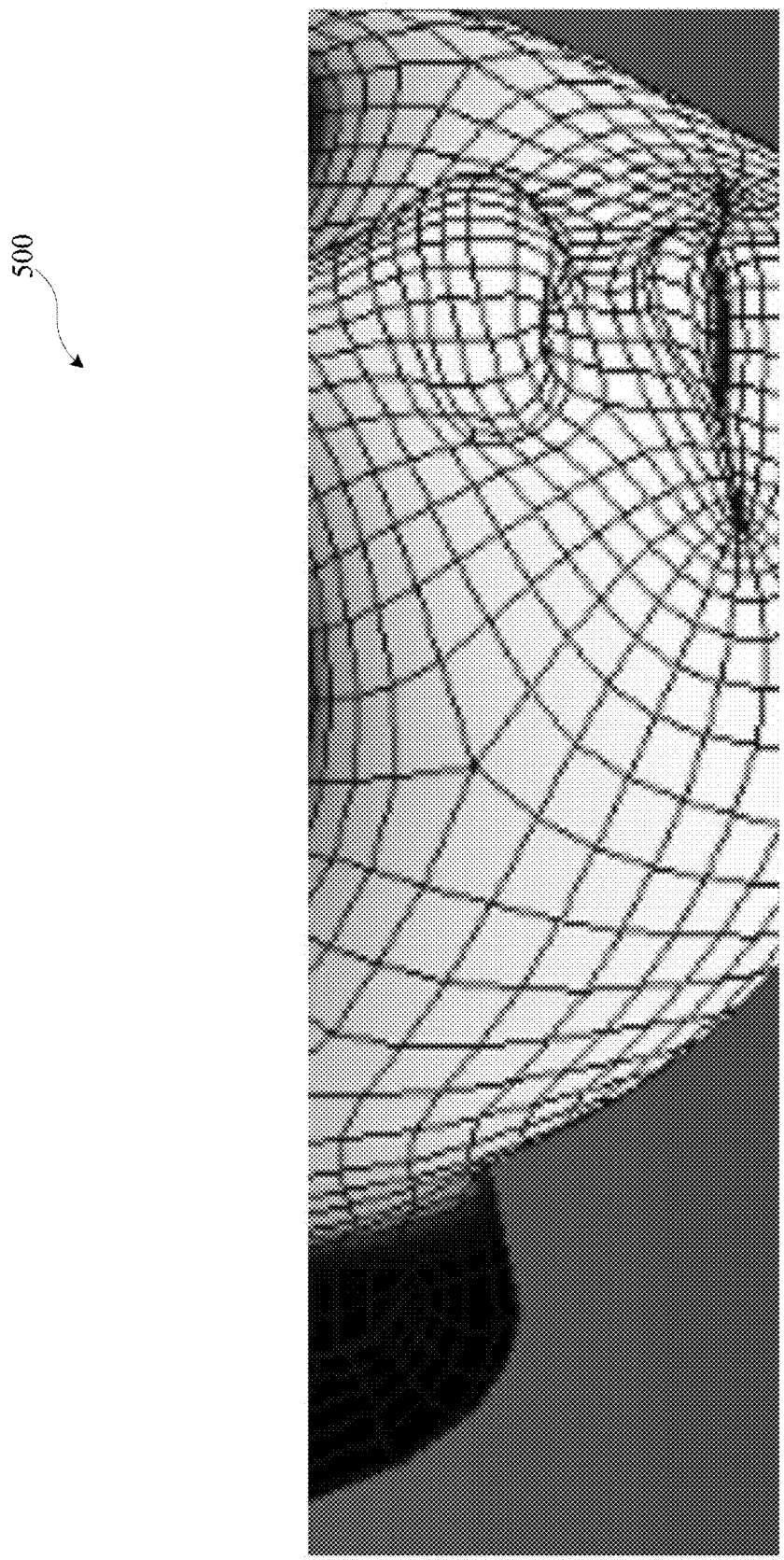
FIG. 5 illustrates an example weight map of an animatable model, in accordance with embodiments of the disclosure.

FIG. 5 illustrates example weight maps of an animatable model, in accordance with embodiments of the disclosure. The weight map may be the white color that fades across the face. The facial weight map may be driven by the head partition and related bones, joints, deformers, and/or dependencies. In other words, the head partition may be processed in parallel with the body partition, for example.

Figure 6:
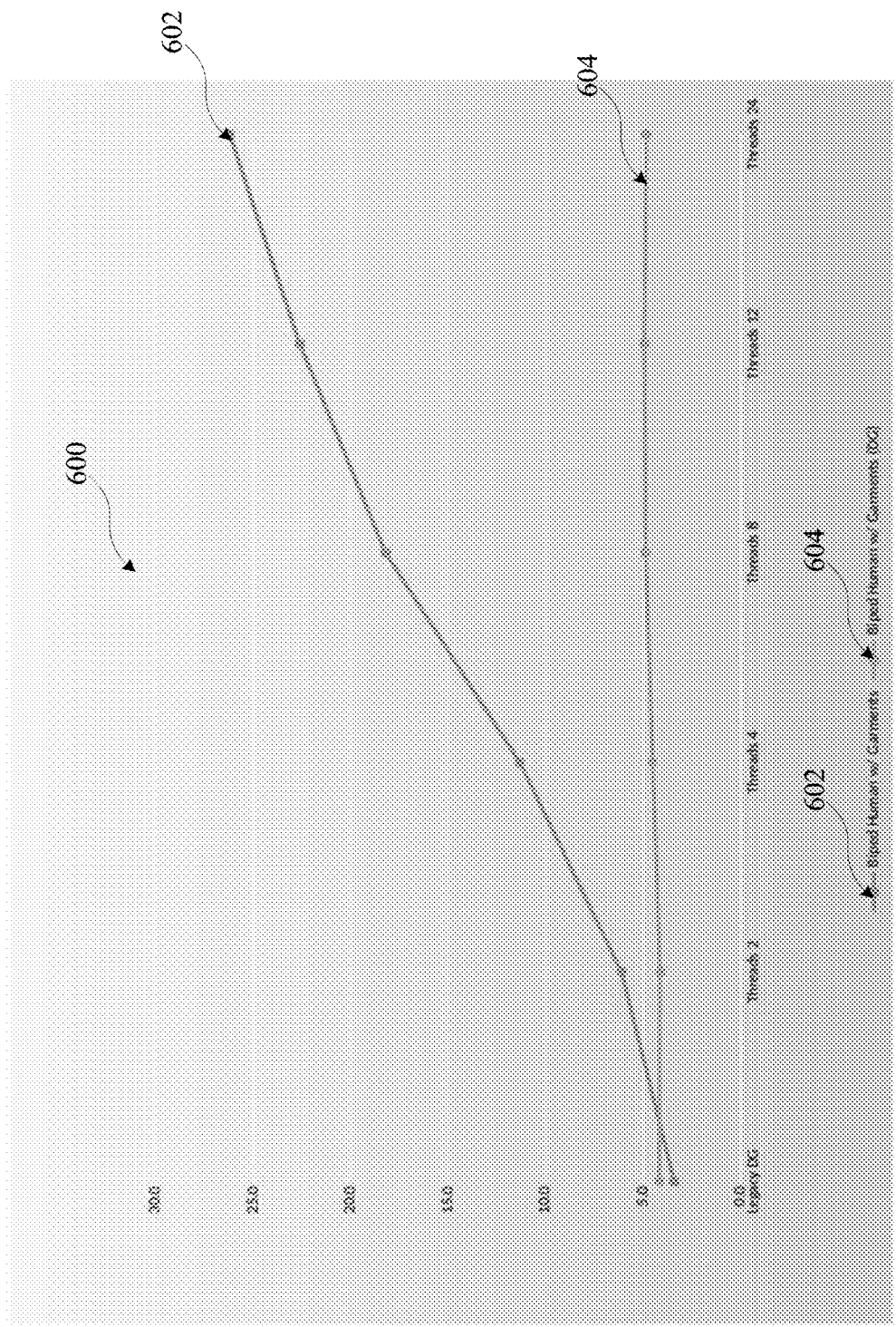
FIG. 6 illustrates an example performance graph, in accordance with embodiments of the disclosure.

FIG. 6 illustrates an example performance graph, in accordance with embodiments of the disclosure. Graph 600 may represent performance of a biped human with garments as the animatable model. As illustrated, line 602 illustrates an effect the presently disclosed technology has on frame rate as the number of threads increases. Line 604 illustrates the frame rates of an existing technology that does not effectively utilize the processing resources. As a result, line 604 stays flat regardless of the number of threads available.

Figures 7A, 7B:
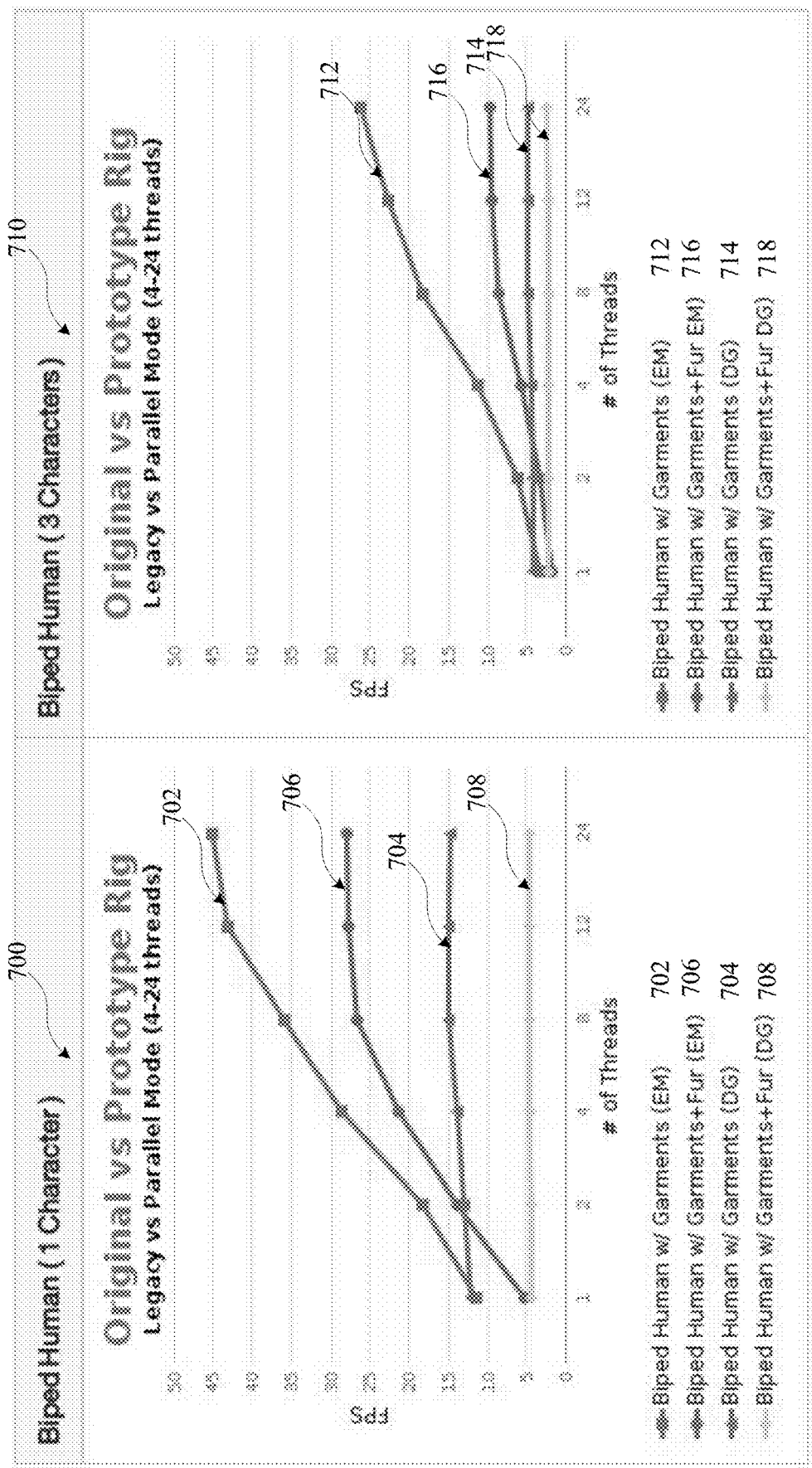
FIG. 7A illustrates an example performance graph, in accordance with embodiments of the disclosure.
FIG. 7B illustrates an example performance graph, in accordance with embodiments of the disclosure.

FIG. 7A illustrates an example performance graph, in accordance with embodiments of the disclosure. Lines 702 and 704 may represent performance of a biped human with garments as the animatable model. Line 702 illustrates that as the number of threads increases, the frames per second (FPS) increases as well. Line 704 illustrates existing technology failing to effectively utilize processing resources. As a result, line 704 stays flat regardless of the number of threads available. Lines 706 and 708 may represent performance of a biped human with garments and fur as the animatable model. Line 706 illustrates that as the number of threads increases, the FPS increases as well. Line 708 illustrates existing technology failing to effectively utilize processing resources, which is substantially similar to line 704.

FIG. 7B illustrates an example performance graph, in accordance with embodiments of the disclosure. Lines 712 and 714 may represent performance of three biped humans with garments as the animatable models. Line 712 illustrates that as the number of threads increases, the FPS increases as well. Line 714 illustrates existing technology failing to effectively utilize processing resources. As a result, line 714 stays flat regardless of the number of threads available. Lines 716 and 718 may represent performance of three biped humans with garments and fur as the animatable models. Line 716 illustrates that as the number of threads increases, the FPS increases as well. Line 718 illustrates existing technology failing to effectively utilize processing resources, which is substantially similar to line 714.

Figures 8A, 8B:
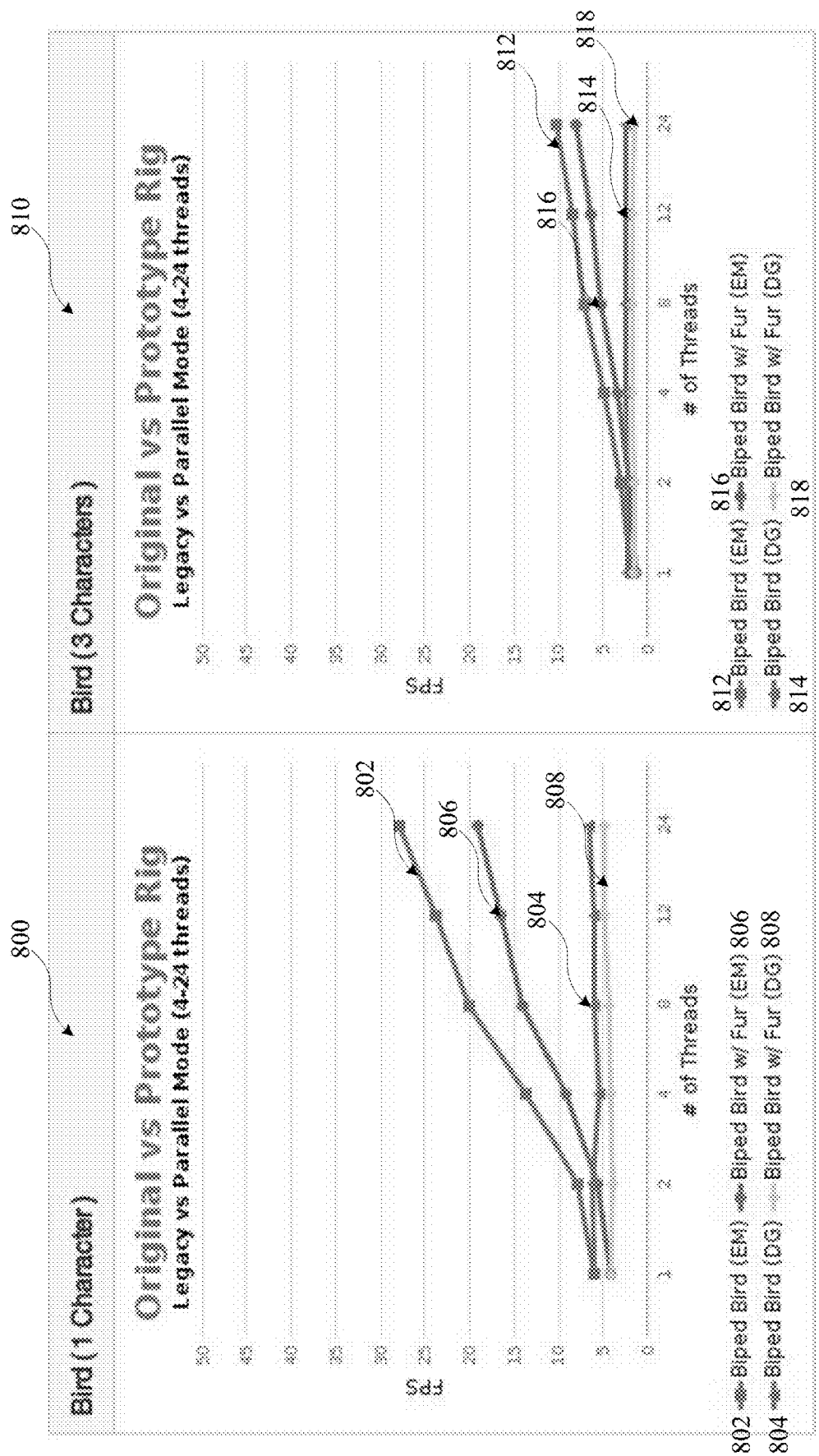
FIG. 8A illustrates an example performance graph, in accordance with embodiments of the disclosure.
FIG. 8B illustrates an example performance graph, in accordance with embodiments of the disclosure.

FIG. 8A illustrates an example performance graph, in accordance with embodiments of the disclosure. Lines 802 and 804 may represent performance of a biped bird as the animatable model. Line 802 illustrates that as the number of threads increases, the FPS increases as well. Line 804 illustrates existing technology failing to effectively utilize processing resources. As a result, line 804 stays flat regardless of the number of threads available. Lines 806 and 808 may represent performance of a biped bird with fur as the animatable model. Line 806 illustrates that as the number of threads increases, the FPS increases as well. Line 808 illustrates existing technology failing to effectively utilize processing resources, which is substantially similar to line 804.

FIG. 8B illustrates an example performance graph, in accordance with embodiments of the disclosure. Lines 812 and 814 may represent performance of three biped birds as the animatable models. Line 812 illustrates that as the number of threads increases, the FPS increases as well. Line 814 illustrates existing technology failing to effectively utilize processing resources. As a result, line 814 stays flat regardless of the number of threads available. Lines 816 and 818 may represent performance of three biped birds with fur as the animatable models. Line 816 illustrates that as the number of threads increases, the FPS increases as well. Line 818 illustrates existing technology failing to effectively utilize processing resources, which is substantially similar to line 814.

Figures 9A, 9B:
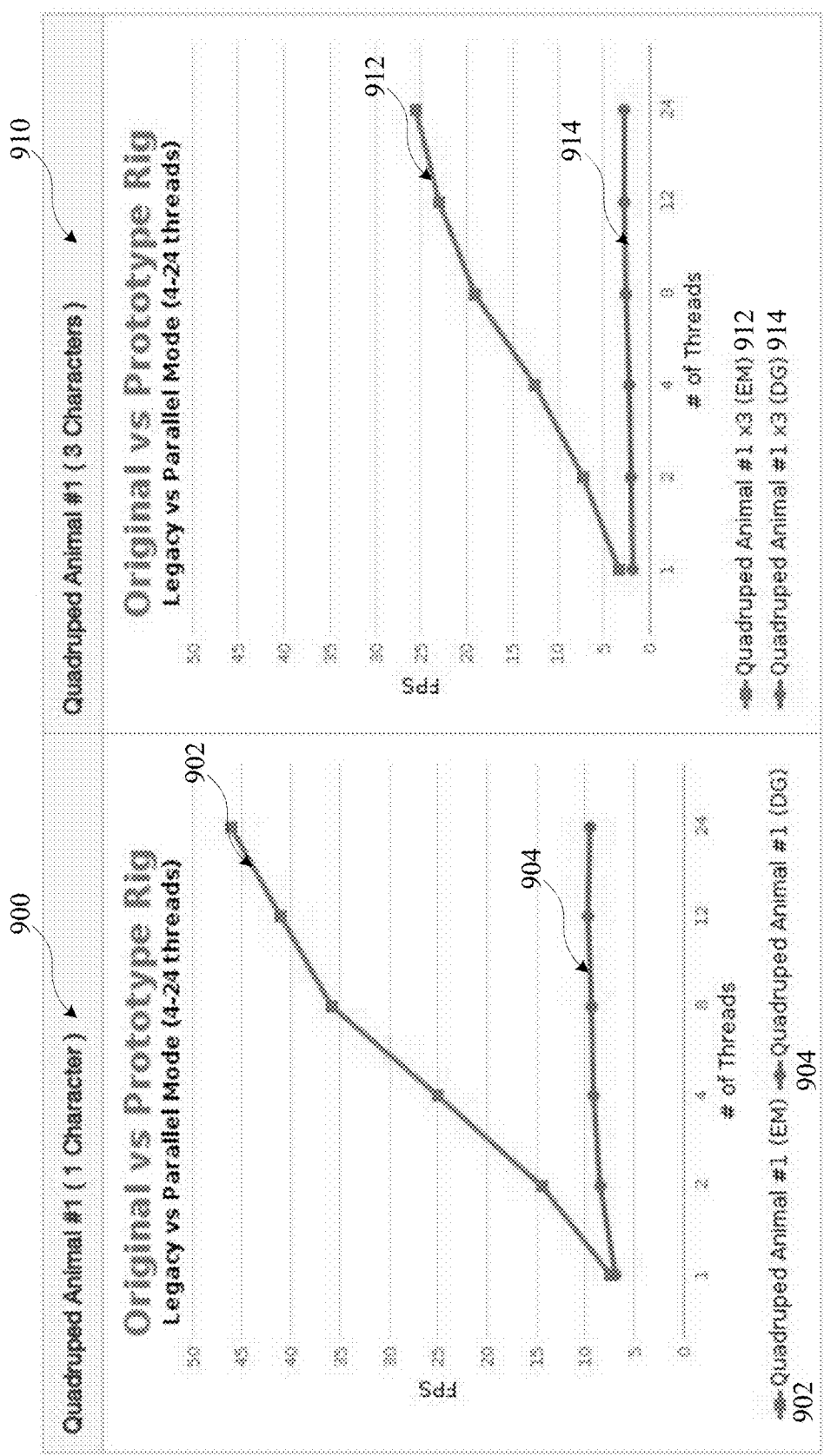
FIG. 9A illustrates an example performance graph, in accordance with embodiments of the disclosure.
FIG. 9B illustrates an example performance graph, in accordance with embodiments of the disclosure.

FIG. 9A illustrates an example performance graph, in accordance with embodiments of the disclosure. Graph 900 may represent performance of a quadruped animal as the animatable model. Line 902 illustrates that as the number of threads increases, the FPS increases as well. Line 904 illustrates existing technology failing to effectively utilize processing resources. As a result, line 904 stays flat regardless of the number of threads available.

FIG. 9B illustrates an example performance graph, in accordance with embodiments of the disclosure. Graph 910 may represent performance of three quadruped animals as the animatable models. Line 912 illustrates that as the number of threads increases, the FPS increases as well. Line 914 illustrates existing technology failing to effectively utilize processing resources. As a result, line 914 stays flat regardless of the number of threads available.

Figures 10A, 10B:
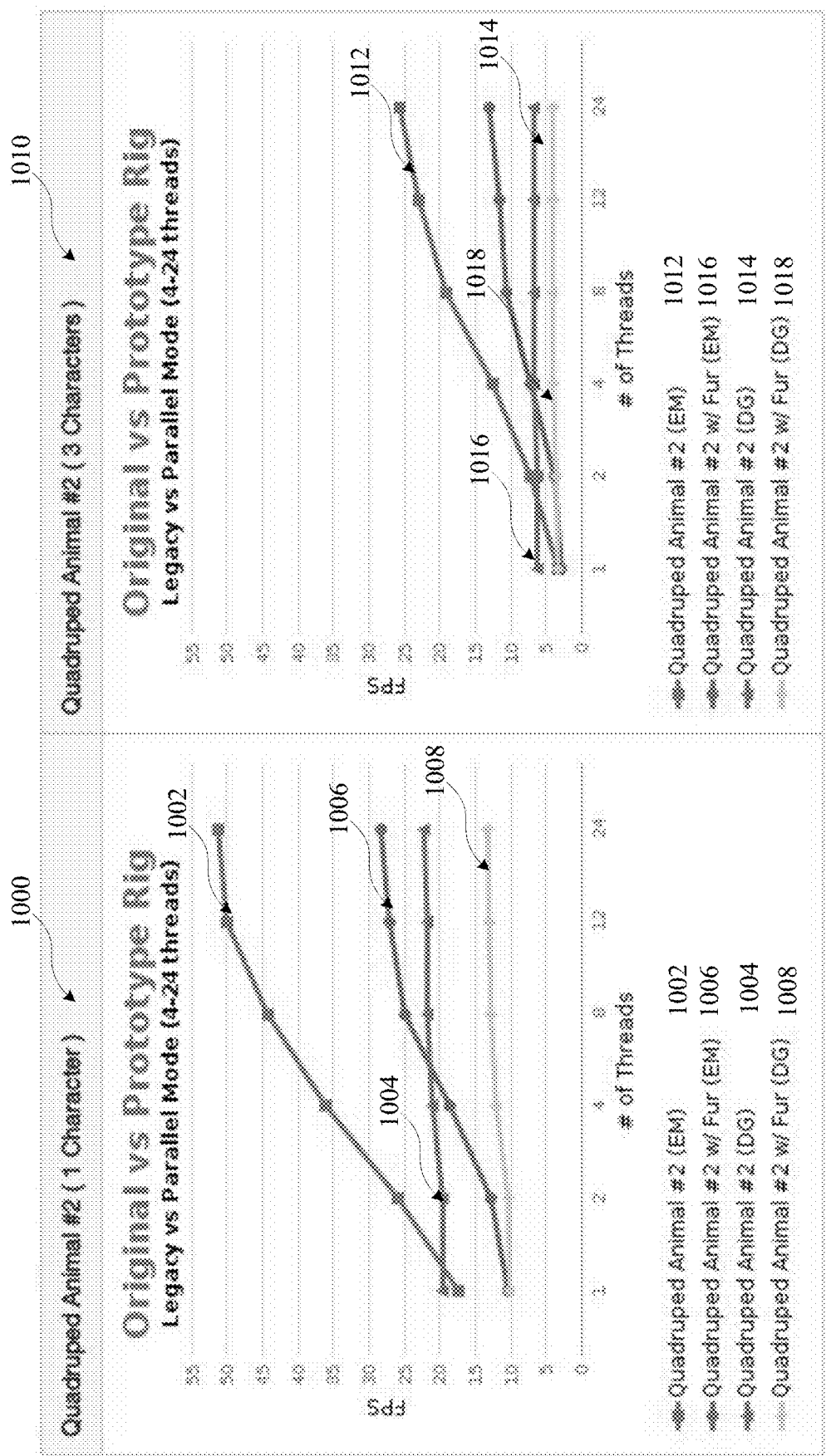
FIG. 10A illustrates an example performance graph, in accordance with embodiments of the disclosure.
FIG. 10B illustrates an example performance graph, in accordance with embodiments of the disclosure.

FIG. 10A illustrates an example performance graph, in accordance with embodiments of the disclosure. Lines 1002 and 1004 may represent performance of a quadruped animal as the animatable model. Line 1002 illustrates that as the number of threads increases, the FPS increases as well. Line 1004 illustrates existing technology failing to effectively utilize processing resources. As a result, line 1004 stays flat regardless of the number of threads available. Lines 1006 and 1008 may represent performance of a quadruped animal with fur as the animatable model. Line 1006 illustrates that as the number of threads increases, the FPS increases as well. Line 1008 illustrates existing technology failing to effectively utilize processing resources, which is substantially similar to line 1004.

FIG. 10B illustrates an example performance graph, in accordance with embodiments of the disclosure. Lines 1012 and 1014 may represent performance of three quadruped animals as the animatable models. Line 1012 illustrates that as the number of threads increases, the FPS increases as well. Line 1014 illustrates existing technology failing to effectively utilize processing resources. As a result, line 1014 stays flat regardless of the number of threads available. Lines 1016 and 1018 may represent performance of three quadruped animals with fur as the animatable models. Line 1016 illustrates that as the number of threads increases, the FPS increases as well. Line 1018 illustrates existing technology failing to effectively utilize processing resources, which is substantially similar to line 1014.

The presently disclosed technology improves processor resource allocation for software-agnostic character rigs and/or animation tools. The presently disclosed technology can be easily implemented into various workflows without extensive user training that may be appropriate for existing technologies. Since, the presently disclosed technology may be software-agnostic, the cost of improving FPS is reduced. The presently disclosed technology may allow quick evaluation of animatable models at usable speeds (e.g., at or above about twenty-four FPS). The presently disclosed technology can be used in a filming environment, a video game environment, and/or other environments. For example, the presently disclosed technology can increase efficiency from idea conception to animation of a model. The presently disclosed technology may allow riggers to review animatable models at higher FPS than existing technology can, thereby making quick corrections to the model before moving the animatable model further in the workflow.

FIG. 11 illustrates example computing component 1100, which may in some instances include a processor/controller resident on a computer system (e.g., server system 106 and/or electronic device 102). Computing component 1100 may be used to implement various features and/or functionality of embodiments of the systems, devices, and methods disclosed herein. With regard to the above-described embodiments set forth herein in the context of systems, devices, and methods described with reference to FIGS. 1 through 10B, including embodiments involving device 102 and/or server system 106, it may be appreciated additional variations and details regarding the functionality of these embodiments that may be carried out by computing component 1100. In this connection, it will also be appreciated upon studying the present disclosure that features and aspects of the various embodiments (e.g., systems) described herein may be implemented with respect to other embodiments (e.g., methods) described herein without departing from the spirit of the disclosure.

As used herein, the term component may describe a given unit of functionality that may be performed in accordance with one or more embodiments of the present application. As used herein, a component may be implemented utilizing any form of hardware, software, or a combination thereof. For example, one or more processors, controllers, ASICs, PLAs, PALs, CPLDs, FPGAs, logical components, software routines, or other mechanisms may be implemented to make up a component. In implementation, the various components described herein may be implemented as discrete components or the functions and features described may be shared in part or in total among one or more components. In other words, it should be appreciated that after reading this description, the various features and functionality described herein may be implemented in any given application and may be implemented in one or more separate or shared components in various combinations and permutations. Even though various features or elements of functionality may be individually described or claimed as separate components, it will be appreciated that upon studying the present disclosure that these features and functionality may be shared among one or more common software and hardware elements, and such description shall not require or imply that separate hardware or software components are used to implement such features or functionality.

Where components of the application are implemented in whole or in part using software, in embodiments, these software elements may be implemented to operate with a computing or processing component capable of carrying out the functionality described with respect thereto. One such example computing component is shown in FIG. 11. Various embodiments are described in terms of example computing component 1100. After reading this description, it will be appreciated how to implement example configurations described herein using other computing components or architectures.

Referring now to FIG. 11, computing component 1100 may represent, for example, computing or processing capabilities found within mainframes, supercomputers, workstations or servers; desktop, laptop, notebook, or tablet computers; hand-held computing devices (tablets, PDA's, smartphones, cell phones, palmtops, etc.); or the like, depending on the application and/or environment for which computing component 1100 is specifically purposed.

Computing component 1100 may include, for example, one or more processors, controllers, control components, or other processing devices, such as a processor 1110, and such as may be included in circuitry 1105. Processor 1110 may be implemented using a special-purpose processing engine such as, for example, a microprocessor, controller, or other control logic. In the illustrated example, processor 1110 is connected to bus 1155 by way of circuitry 1105, although any communication medium may be used to facilitate interaction with other components of computing component 1100 or to communicate externally.

Computing component 1100 may also include one or more memory components, simply referred to herein as main memory 1115. For example, random access memory (RAM) or other dynamic memory may be used for storing information and instructions to be executed by processor 1110 or circuitry 1105. Main memory 1115 may also be used for storing temporary variables or other intermediate information during execution of instructions to be executed by processor 1110 or circuitry 1105. Computing component 1100 may likewise include a read only memory (ROM) or other static storage device coupled to bus 1155 for storing static information and instructions for processor 1110 or circuitry 1105.

Computing component 1100 may also include one or more various forms of information storage devices 1120, which may include, for example, media drive 1130 and storage unit interface 1135. Media drive 1130 may include a drive or other mechanism to support fixed or removable storage media 1125. For example, a hard disk drive, a floppy disk drive, a magnetic tape drive, an optical disk drive, a CD or DVD drive (R or RW), or other removable or fixed media drive may be provided. Accordingly, removable storage media 1125 may include, for example, a hard disk, a floppy disk, magnetic tape, cartridge, optical disk, a CD or DVD, or other fixed or removable medium that is read by, written to, or accessed by media drive 1130. As these examples illustrate, removable storage media 1125 may include a computer usable storage medium having stored therein computer software or data.

In alternative embodiments, information storage devices 1120 may include other similar instrumentalities for allowing computer programs or other instructions or data to be loaded into computing component 1100. Such instrumentalities may include, for example, fixed or removable storage unit 1140 and storage unit interface 1135. Examples of such removable storage units 1140 and storage unit interfaces 1135 may include a program cartridge and cartridge interface, a removable memory (for example, a flash memory or other removable memory component) and memory slot, a PCMCIA slot and card, and other fixed or removable storage units 1140 and storage unit interfaces 1135 that allow software and data to be transferred from removable storage unit 1140 to computing component 1100.

Computing component 1100 may also include a communications interface 1150. Communications interface 1150 may be used to allow software and data to be transferred between computing component 1100 and external devices. Examples of communications interface 1150 include a modem or softmodem, a network interface (such as an Ethernet, network interface card, WiMedia, IEEE 1102.XX, or other interface), a communications port (such as for example, a USB port, IR port, RS232 port Bluetooth® interface, or other port), or other communications interface. Software and data transferred via communications interface 1150 may typically be carried on signals, which may be electronic, electromagnetic (which includes optical) or other signals capable of being exchanged by a given communications interface 1150. These signals may be provided to/from communications interface 1150 via channel 1145. Channel 1145 may carry signals and may be implemented using a wired or wireless communication medium. Some non-limiting examples of channel 1145 include a phone line, a cellular or other radio link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 1115, storage unit interface 1135, removable storage media 1125, and channel 1145. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions may enable the computing component 1100 or a processor to perform features or functions of the present application as discussed herein.

Various embodiments have been described with reference to specific example features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various example embodiments and implementations, it should be understood that the various features, aspects, and functionality described in one or more of the individual embodiments are not limited in their applicability to the particular embodiment with which they are described, but instead may be applied, alone or in various combinations, to one or more of the other embodiments of the present application, whether or not such embodiments are described and whether or not such features are presented as being a part of a described embodiment. Thus, the breadth and scope of the present application should not be limited by any of the above-described example embodiments.

Terms and phrases used in the present application, and variations thereof, unless otherwise expressly stated, should be construed as open ended as opposed to limiting. As examples of the foregoing: the term "including" should be read as meaning "including, without limitation," or the like; the term "example" is used to provide illustrative instances of the item in discussion, not an exhaustive or limiting list thereof; the terms "a" or "an" should be read as meaning "at least one," "one or more," or the like; and adjectives such as "standard," "known," and terms of similar meaning should not be construed as limiting the item described to a given time period or to an item available as of a given time, but instead should be read to encompass standard technologies that may be available or known now or at any time in the future. Likewise, where this document refers to technologies that would be appreciated to one of ordinary skill in the art, such technologies encompass that which would be appreciated by the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, may be combined in a single package or separately maintained and may further be distributed in multiple groupings or packages or across multiple locations.

Additionally, the various embodiments set forth herein are described in terms of example block diagrams, flow charts, and other illustrations. As will be appreciated after reading this document, the illustrated embodiments and their various alternatives may be implemented without confinement to the illustrated examples. For example, block diagrams and their accompanying description should not be construed as mandating a particular architecture or configuration.

What is claimed is:

1. A system for partitioning an animatable model, the system comprising:
   a non-transitory computer-readable medium operatively coupled to processors and storing instructions that, when executed, cause the processors to:
   obtain an animatable model, wherein the animatable model comprises a geometry matrix;
   obtain user input to partition an animatable model into multiple partitions, wherein the user input comprises a connected curve in the geometry matrix; and
   partition the animatable model into the multiple partitions based on the user input, wherein individual ones of the multiple partitions comprise a partition geometry matrix and a corresponding partition animatable model, wherein partitioning the animatable model into the multiple partitions is based on node density.

2. The system of claim 1, wherein the non-transitory computer-readable medium further stores instructions that, when executed, cause the processors to:
   obtain animation data; and
   drive the multiple partitions in parallel to animate the animatable model for multiple frames based on the animation data.

3. The system of claim 2, wherein the animation data comprises information on how the animatable model will be animated over the multiple frames.

4. The system of claim 1, wherein the animatable model represents a humanoid character.

5. The system of claim 4, wherein the multiple partitions represents different body parts of the humanoid character.

6. The system of claim 4, wherein the multiple partitions represent different sub-body parts.

7. A computer-implemented method for partitioning an animatable model, the computer-implemented method being implemented in a computer system including non-transient electronic storage and a physical computer processor, the computer-implemented method comprising:
   obtaining an animatable model, wherein the animatable model comprises a geometry matrix;
   obtaining user input to partition an animatable model into multiple partitions; and
   partitioning the animatable model into the multiple partitions based on the user input, wherein individual ones of the multiple partitions comprise a partition geometry matrix and a corresponding partition animatable model, wherein partitioning the animatable model into the multiple partitions is based on node density.

8. The computer-implemented method of claim 7, further comprising:
   obtaining animation data; and
   driving the multiple partitions in parallel to animate the animatable model for multiple frames based on animation data.

9. The computer-implemented method of claim 8, wherein the animation data comprises information on how the animatable model will be animated over the multiple frames.

10. The computer-implemented method of claim 9, wherein the multiple partitions represents different body parts of the animal character.

11. The computer-implemented method of claim 9, wherein the multiple partitions represent different sub-body parts.

12. The computer-implemented method of claim 7, wherein the animatable model represents an animal character.

13. The computer-implemented method of claim 7, wherein the user input comprises a connected shape in the geometry matrix.

14. A computer-implemented method for partitioning an animatable model, the computer-implemented method being implemented in a computer system including non-transient electronic storage and a physical computer processor, the computer-implemented method comprising:
obtaining an animatable model, wherein the animatable model comprises a geometry matrix; and
partitioning the animatable model into multiple individually drivable partitions, wherein individual ones of the multiple partitions comprise a partition geometry matrix and a corresponding partition animatable model, wherein partitioning the animatable model into the multiple partitions is based on node density.

15. The computer-implemented method of claim 14, further comprising driving the multiple partitions in parallel to animate the animatable model as a unitary model.

16. The computer-implemented method of claim 14, wherein partitioning the animatable model into the multiple partitions is based on animation data.

17. The computer-implemented method of claim 16, wherein the animation data comprises motion density information.

18. The computer-implemented method of claim 14, wherein partitioning the animatable model into the multiple partitions is based on weight maps.

19. The computer-implemented method of claim 14, wherein the computer system further includes a graphical user interface, and the computer-implemented method further comprises displaying multiple frames in which the animatable model is animated by driving the multiple partitions in parallel.

* * * * *